United States Patent
Adachi et al.

(10) Patent No.: US 9,618,315 B2
(45) Date of Patent: Apr. 11, 2017

(54) SENSOR (71) Applicant: AISIN SEIKI KABUSHIKI KAISHA, Kariya-shi, Aichi (JP)

(72) Inventors: Kazuhiro Adachi, Chita-gun (JP); Koji Kawasaki, Kariya (JP)

(73) Assignee: AISIN SEIKI KABUSHIKI KAISHA, Aichi-ken (JP)

( * ) Notice: Subject to any disclaimer, the term of this patent is extended or adjusted under 35 U.S.C. 154(b) by 243 days.

(21) Appl. No.: 14/360,478

(22) PCT Filed: Jan. 10, 2013

(86) PCT No.: PCT/JP2013/050316
§ 371 (c)(1),
(2) Date: May 23, 2014

(87) PCT Pub. No.: WO2013/111619
PCT Pub. Date: Aug. 1, 2013

(65) Prior Publication Data
US 2014/0320113 A1 Oct. 30, 2014

(30) Foreign Application Priority Data

Jan. 23, 2012 (JP) .................................. 2012-011369

(51) Int. Cl.
*G01B 7/00* (2006.01)
*G01P 1/02* (2006.01)
(Continued)

(52) U.S. Cl.
CPC ........... *G01B 7/003* (2013.01); *G01D 11/245* (2013.01); *G01P 1/00* (2013.01); *G01P 1/026* (2013.01); *G01P 3/487* (2013.01); *G01D 5/2451* (2013.01)

(58) Field of Classification Search
USPC ....................................... 304/207.2
See application file for complete search history.

(56) References Cited

U.S. PATENT DOCUMENTS 6,009,621 A * 1/2000 Nishi ..................... H01R 4/04
29/828
2004/0241358 A1 12/2004 Kotani et al.
(Continued)

FOREIGN PATENT DOCUMENTS

JP 09105603 A 4/1997
JP 11-295331 A 10/1999
(Continued)

OTHER PUBLICATIONS

International Search Report of PCT/JP2013/050316 dated Apr. 9, 2013.
(Continued)

*Primary Examiner* — Paul West
*Assistant Examiner* — Mark A Shabman
(74) *Attorney, Agent, or Firm* — Sughrue Mion, PLLC (57) ABSTRACT

Provided is a sensor capable of holding a sensing element at a position of good sensitivity without requiring filling of the case with resin. The sensor includes a sensing element, a case accommodating the sensing element and having a detecting face for the sensing element in an outer face thereof, a holder accommodated inside the case together with the sensing element and pressing the sensing element toward the detecting face and a cable electrically connected to the sensing element. At least one of the holder and the case includes a contact portion deformable by a pressing force generated when the sensing element is pressed toward the detecting face.

4 Claims, 10 Drawing Sheets

(51) Int. Cl.
*G01P 3/487* (2006.01)
*G01P 1/00* (2006.01)
*G01D 11/24* (2006.01)
*G01D 5/245* (2006.01)

(56) References Cited

U.S. PATENT DOCUMENTS

2005/0268732 A1* 12/2005 Fujita ................ G01P 1/026
                                                      73/862.08
2006/0169059 A1   8/2006 Kawasaki et al.
2007/0057665 A1   3/2007 Borst et al.

FOREIGN PATENT DOCUMENTS

| JP | 2000-164267 A | 6/2000 |
|----|---------------|--------|
| JP | 2003-198093 A | 7/2003 |
| JP | 2004-264213 A | 9/2004 |
| JP | 2005-007872 A | 1/2005 |
| JP | 2005-227095 A | 8/2005 |
| JP | 2005-337892 A | 12/2005 |
| JP | 2006-208247 A | 8/2006 |
| JP | 2006-329922 A | 12/2006 |
| JP | 2007-121109 A | 5/2007 |
| JP | 2007523336 A  | 8/2007 |

OTHER PUBLICATIONS

Written Opinion of PCT/JP2013/050316 dated Apr. 9, 2013.
Communication dated Jul. 30, 2015 from the Japanese Patent Office in counterpart application No. 2012-011369.
Communication dated Feb. 9, 2016, from the Japanese Patent Office in counterpart application No. 2012011369.
English Translation of International Preliminary Report on Patentability for PCT/JP2013/050316 dated Aug. 7, 2014.
U.S. Appl. No. 15/117,932, filed Aug. 10, 2016, Kazuhiro Adachi, et al.

* cited by examiner

SENSOR

CROSS REFERENCE TO RELATED APPLICATIONS

This is a National Stage of International Application No. PCT/JP2013/050316 filed Jan. 10, 2013, claiming priority based on Japanese Patent Application No. 2012-011369 filed Jan. 23, 2012, the contents of all of which are incorporated herein by reference in their entirety.

TECHNICAL FIELD

The present invention relates to a sensor in which a sensing element accommodated in a case is held under a position-fixed state.

BACKGROUND ART

Conventionally, a rotation detection sensor for use in e.g. detection of a vehicle speed includes a sensing element accommodated in a case formed of a resin or the like and fixed to the vehicle. The sensing element is disposed in opposition to a detected portion which is attached to a detection target such as an inner wheel of a bearing and rotatable in unison with the detection target. As the sensing element detects a magnetic flux amount which varies in association with rotation of the magnetized detected portion, the rotational speed of a vehicle axle is detected. Therefore, with such rotation detection sensor, precise positioning of the sensing element relative to the detected portion is required.

A rotation detection sensor disclosed in Patent Document 1 includes a fixed member, a holder (a detecting portion) having a sensing element (a Hall-effect IC), and a case covering the sensing element (a Hall-effect IC). In an outer face of the case, a detecting face is provided and the sensing element (a Hall-effect IC) is positioned on the back side of the detecting face through insertion of a portion of the holder into the case.

CITATION LIST

Patent Literature

Patent Document 1: Japanese Unexamined Patent Application Publication No. 2006-208247

SUMMARY OF INVENTION

In the case of the rotation detection sensor of Patent Document 1, as movement of the case along the longitudinal direction (base end direction) is restricted at the time of resin molding of a fixing portion, the sensing element is fixed in position at the position in opposition to the detected portion. However, as the sensing element is merely inserted and disposed in the inside of the case via the holder, a gap normally exists between the back side of the detecting face and the sensing element. In order to improve the detection sensitivity of the sensing element, it is desired to dispose the sensing element under an appropriate posture as closely as possible to the back side of the detecting face. For instance, it is possible to press the sensing element against the back side of the detecting face by charging an amount of molding resin within the case. However, if molding resin is filled inside the case, the sensing element can be damaged as being exposed to a stress and/or heat from the molding resin. Further, if the case is formed like a bag, filling of the inside of the case with molding resin causes bulging of the case per se, which bulging can render the detection sensitivity of the sensing element unstable.

The object of the present invention is to provide a sensor capable of holding a sensing element at a position of good sensitivity without requiring filling of the case with resin.

According to a first characterizing feature of a sensor relating to the present invention, the sensor comprises: a sensing element; a case accommodating the sensing element and having a detecting face for the sensing element in an outer face thereof; and a holder accommodated inside the case together with the sensing element and pressing the sensing element toward the detecting face; wherein at least one of the holder and the case includes a contact portion deformable by a pressing force generated when the sensing element is pressed toward the detecting face.

With the sensor having the above-described arrangement, as the sensing element is accommodated in the case, this sensing element is pressed toward the detecting face of the outer face of the case by the holder, thus being fixed in position. Also, since the contact portion provided in at least one of the holder and the case is deformable by a pressing force generated when the sensing element is pressed toward the detecting face, this contact portion is deformed by a reaction force received from the detecting face when the sensing element is pressed by the holder. With this deformation of the contact portion, the sensing element can be held under a state with the pressing force to the sensing element being reduced appropriately. As a result, the sensing element can be fixed in position on the side of the detecting face in a reliable manner, without requiring charging of rein into the case in which the element is accommodated.

According to a second characterizing feature of the sensor relating to the present invention, the case and a cable to be electrically connected to the sensing element are integrated by a mold-formed portion using resin.

If the case and a cable to be electrically connected to the sensing element are integrated by a mold-formed portion using resin as provided in the above arrangement, both the posture of the case accommodating the sensing element and the posture of the cable to be electrically connected to the sensing element are rendered stable, so that detection sensitivity of the sensor can be maintained.

According to a third characterizing feature of the sensor relating to the present invention, outer faces of the case and the cable are formed of resin; and the case and the cable are bonded to the mold-formed portion by fusion of mutually contacting resin portions thereof.

If outer faces of the case and the cable are formed of resin and the case and the cable are bonded to the mold-formed portion by fusion of mutually contacting resin portions thereof as provided in the above arrangement, a step of applying adhesive material to the case and the cable becomes unnecessary, so the sensor can be manufactured easily.

According to a fourth characterizing feature of a sensor relating to the present invention, the holder includes a lid portion closing an insertion opening of the case.

If the holder includes a lid portion closing an insertion opening for the case as provided in the above arrangement, when the mold-formed portion is formed of resin, it is possible for the lid portion to restrict intrusion of the resin into the case. With this, it is possible to restrict influence of pressure and/or heat from the molding resin to the sensing element. Further, as intrusion of resin into the resin is restricted, it is also possible to prevent inconvenience of bulging of the case for accommodating the sensing element therein by the resin.

According to a fifth characterizing feature of a sensor relating to the present invention, the case is molded in the shape of a bag, and the sensing element and the holder are clamped between opposed inner faces of the case.

With the above-described arrangement, with only inserting and disposing the sensing element and the holder inside the case, the holder will press the sensing element toward the detecting face. Therefore, positioning and position-holding of the sensing element to the detecting face are facilitated.

According to a sixth characterizing feature of a sensor relating to the present invention, the contact portion comprises a projection extending along an insertion direction of the holder.

If the contact portion comprises a projection extending along an insertion direction of the holder as provided in the above arrangement, this projection will guide the holder toward the detecting face while pushing it toward the same in the course of insertion of the holder into the case. As a result, insertion of the holder into the case is facilitated.

According to a seventh characterizing feature of the sensor relating to the present invention, the contact portion is formed in the holder.

In case the contact portion deformable by a pressing force generated when the sensing element is pressed against the detecting face is formed in the case, this contact portion will be formed in the inner face of the case. In some cases, the case accommodating a sensing element disposed therein is formed with a narrow and elongate shape. In such cases, it is difficult to form the contact portion in the inner face of the case. On the other hand, in case the contact portion is formed in the holder as provided in the arrangement described above, the contact portion will be formed in the outer face of the holder. Such contact portion formed in the outer face of the holder is a portion that can be formed by the mold during resin molding, so this contact portion can be formed in a variety of shapes. Therefore, by forming the contact portion in the holder, the contact portion can be formed easily.

DESCRIPTION OF EMBODIMENTS

Embodiments of a sensor relating to the present invention will be explained next with reference to the accompanying figures.

First Embodiment

The sensor relating to the present invention is applicable to a rotation detection sensor for detecting a rotation condition of an axle of a vehicle for instance. The rotation detection sensor detects a rotation condition of the axle by detecting a change amount in a magnetic flux generated from a rotor mounted on the axle as a detection target and rotatable in unison therewith.

Figure 1:
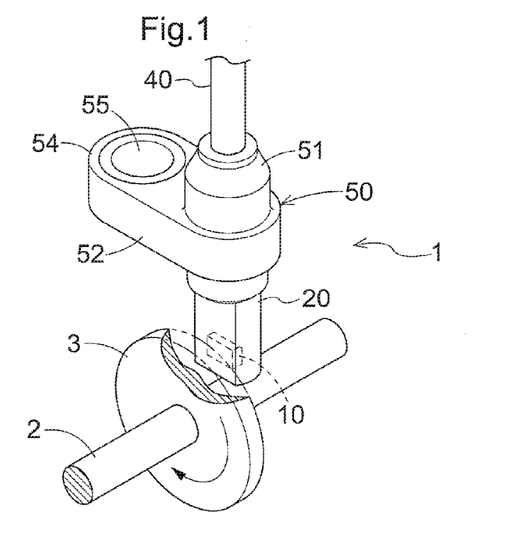
FIG. 1 is a view showing a use condition of a sensor.
Figure 2:
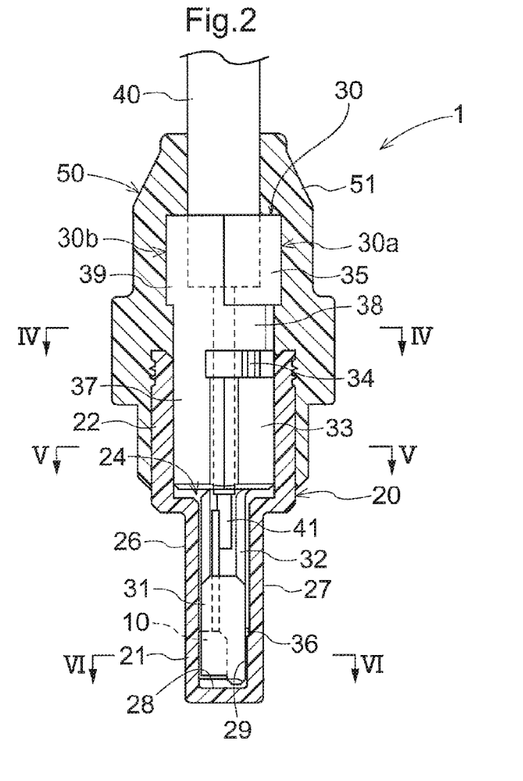
FIG. 2 is a front view in section of the sensor.
Figure 3:
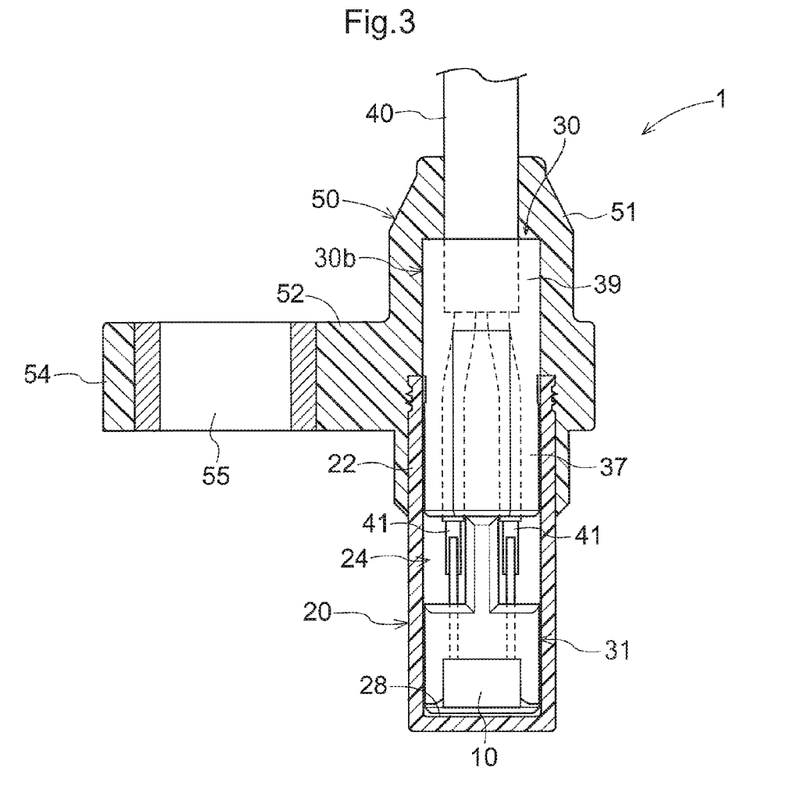
FIG. 3 is a side view in section of the sensor.
Figure 4:
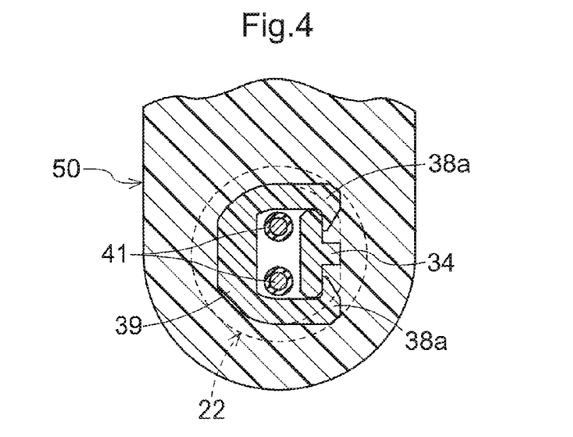
FIG. 4 is a section view taken along a line IV-IV in FIG. 2.
Figure 5:
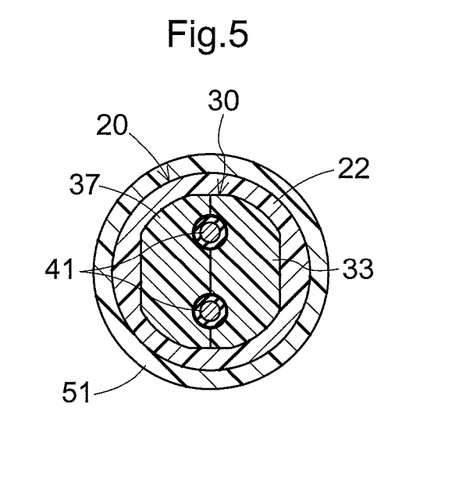
FIG. 5 is a section view taken along a line V-V in FIG. 2.
Figure 6:
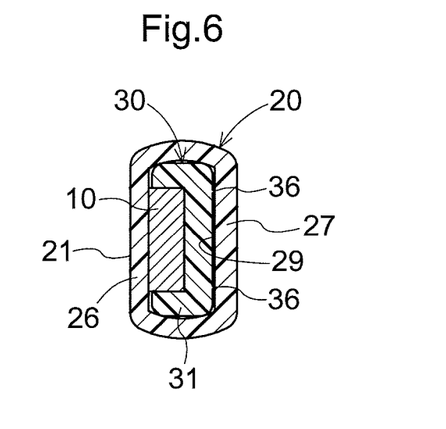
FIG. 6 is a section view taken along a line VI-VI in FIG. 2.
Figure 7:
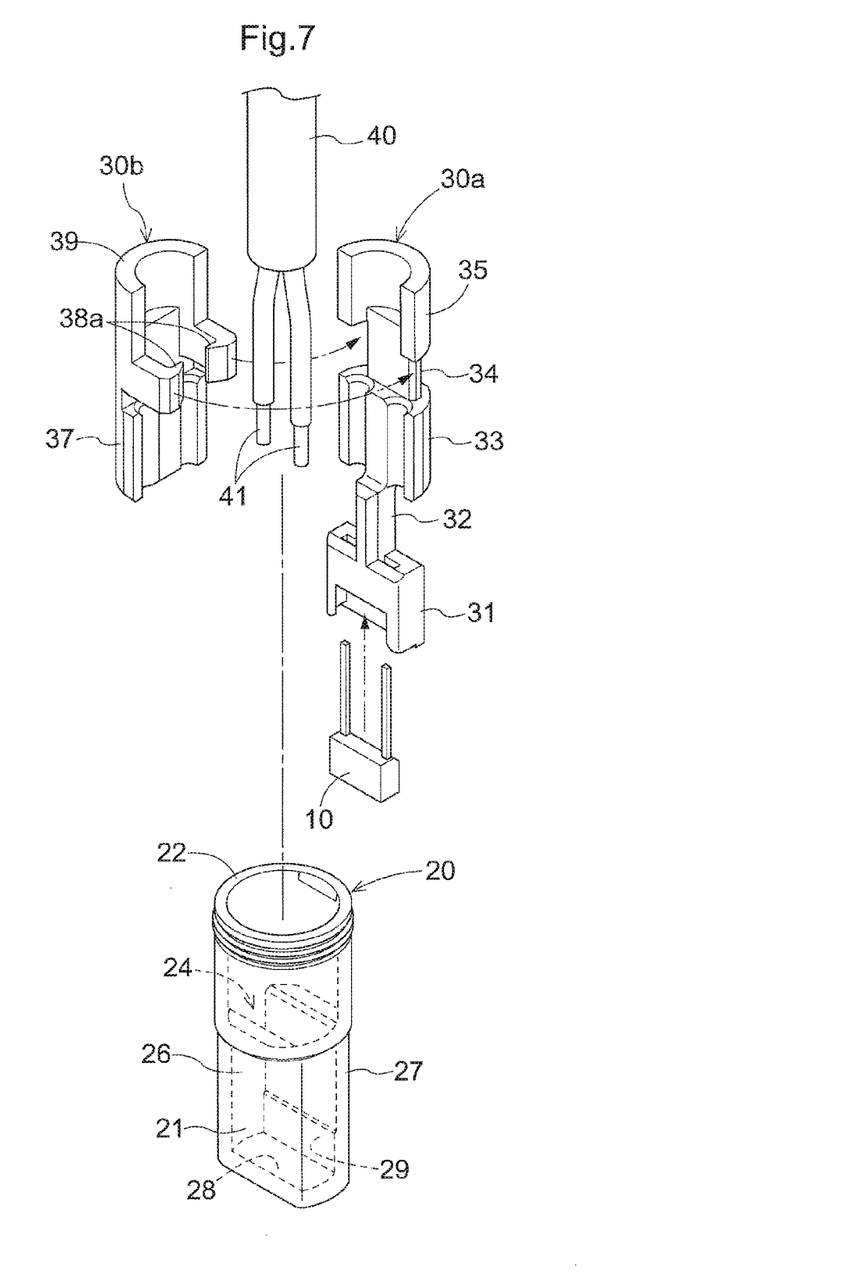
FIG. 7 is an exploded perspective view of the sensor

As shown in FIG. 1, the rotation detection sensor 1 is disposed in opposition to an end face of a magnetized rotor 3 which is mounted coaxially relative to the axle 2. The magnetized rotor 3 has N-poles and S-poles in its end face magnetized in alternation along the circumferential direction thereof. As the magnetized rotor 3 is rotated in unison with the axle 2, there occurs a change in the magnetic flux. As this change in the magnetic flux is detected by the rotation detection sensor 1, a rotational speed of the axle 2, that is, a speed of the vehicle, is detected.

As shown in FIGS. 2-6, the rotation detection sensor 1 includes a sensing element 10, a case 20 accommodating the sensing element 10, a holder 30 accommodated in the case 20 together with the sensing element 10, and a cable 40 electrically connected to the sensing element 10. The case 20 includes, in its outer face, a detecting face 21 for the sensing element 10. The holder 30 is disposed so as to press the sensing element 10 toward the detecting face 21.

The case 20 is formed in the form of a bag and has a cylindrical portion 22 with a cylindrical outer shape and having upper and lower apertures, and a sensing element accommodating portion 24 formed like a rectangular parallelepiped body formed continuously and downwardly from the cylindrical portion 22. The sensing element accommodating portion 24 includes a front face portion 26 on which the detecting face 21 is disposed in opposition to the magnetized rotor 3, and a rear face portion 27 opposed to the front face portion 26. At a lower portion of the rear face portion 27, there is provided a projecting face portion 29 which projects inwards along a bottom portion 28. Therefore, the sensing element accommodating portion 24 has a narrowest area between the front face portion 26 and the projecting face portion 29 of the rear face portion 27.

The holder 30 is formed approximately like a bar and holds, at the leading end thereof, a Hall-effect IC as the sensing element 10 which outputs signals according to changes in a magnetic flux generated in association with rotation of the magnetized rotor 3. The holder 30 is inserted in the case 20 in such a manner that the Hall-effect IC at the leading end is accommodated inside the case 20.

The case 20, the holder 30 and the cable 40 are covered by a mold-formed portion 50 molded of resin. The mold-formed portion 50 includes a main covering portion 51 covering the case 20, the holder 30 and the cable 40, and a fixed support portion 52 to be attached to e.g. a vehicle. The main covering portion 51 and the fixed support portion 52 are formed integral of a resin such as a plastic. If the case 20 and the cable 40 are integrated to each other via the mold-formed portion 50, both the posture of the case 20 accommodating the sensing element (Hall-effect IC) 10 and the posture of the cable 40 electrically connected to the sensing element (Hall-effect IC) 10 are stabilized, such that detection sensitivity of the sensor 1 can be maintained favorably.

The fixed support portion 52 is formed to project toward the outer side in the circumferential direction of the main covering portion 51 disposed on the outer circumference of the holder 30 and includes a bolt fixing portion 54 formed to extend along one direction normal to the radial direction of the main covering portion 51. The bolt fixing portion 54 forms an insertion hole 55 through which an unillustrated fixing member (e.g. a bolt) for fixing the rotation detection sensor 1 to an outer wheel 3b is inserted. The case 20 and the holder 30 are fixed in position in a reliable manner as the fixed support portion 52 is attached to the vehicle or the like.

As shown in FIG. 7, FIG. 8, FIG. 9 and FIG. 10, the holder 30 includes a first holder portion 30a and a second holder portion 30b. The first holder portion 30a includes a sensor holding portion 31 for holding the Hall-effect IC 10, a split-half first wire holding portion 33 for holding wires 41 of the cable 40, and a split-half first cable holding portion 35 for holding the cable 40. Between the sensor holding portion 31 and the first wire holding portion 33, there is provided a first connecting portion 32. Between the first wire holding portion 33 and the first cable holding portion 35, there is provided a second connecting portion 34. To the Hall-effect IC 10, wires 41 of the cable 40 are electrically connected. In the outer face of the sensor holding portion 31 and at a position in opposition to a rear face portion 27 of the case 20, there is provided a deformable contact portion 36.

The contact portion 36 provided in the holder 30 is a projecting portion extending along the direction of inserting the holder 30 to the case 20. When the holder 30 is inserted into the case 20, this projecting portion (contact portion) 36 pushes and guides the holder 30 toward the detecting face 21. With this, insertion of the holder 30 into the case 20 is facilitated.

The second holder portion 30a includes a split-half second wire holding portion 37 and a split-half second cable holding portion 39. Between the second wire holding portion 37 and the second cable holding portion 39, there is provided a third connecting portion 38 having pawls 38a, 38a formed to project toward the second connecting portion 34. As the pawls 38a, 38a are snap-fitted on the second connecting portion 34 of the first holder portion 30a, the holder 30 is completed and the wires 41 are held in this holder 30.

Figure 8:
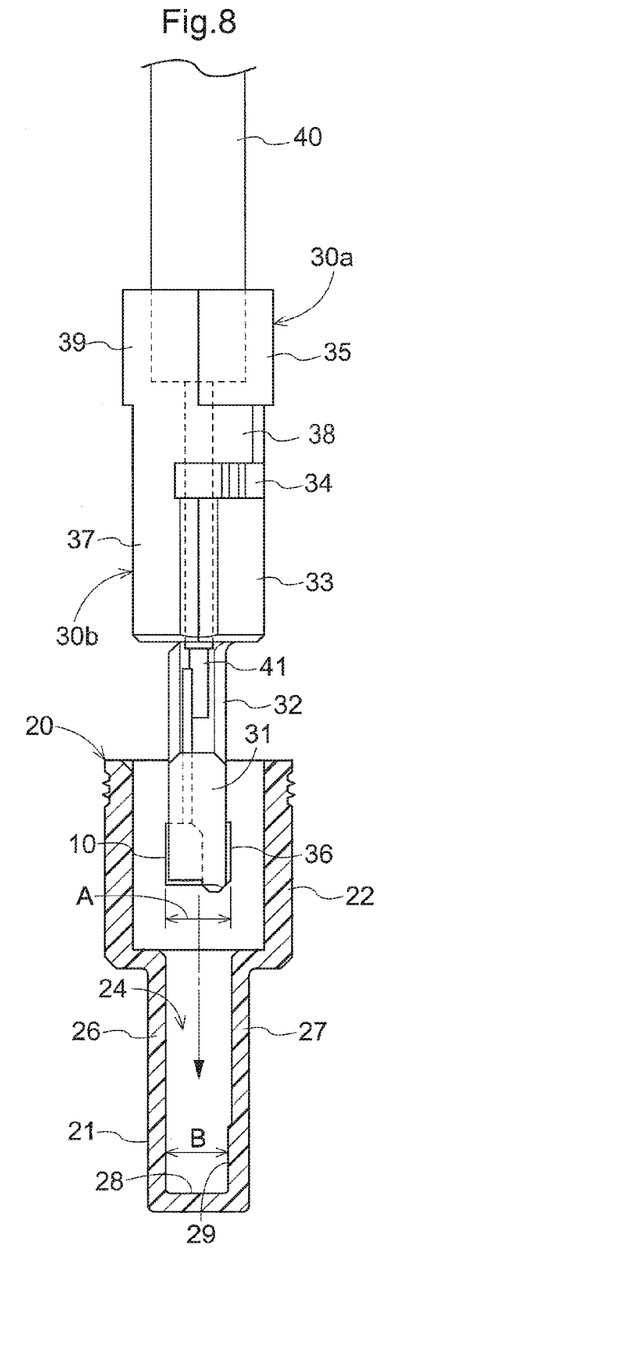
FIG. 8 is a view showing a state when a holder is inserted and disposed in a case.
Figure 9:
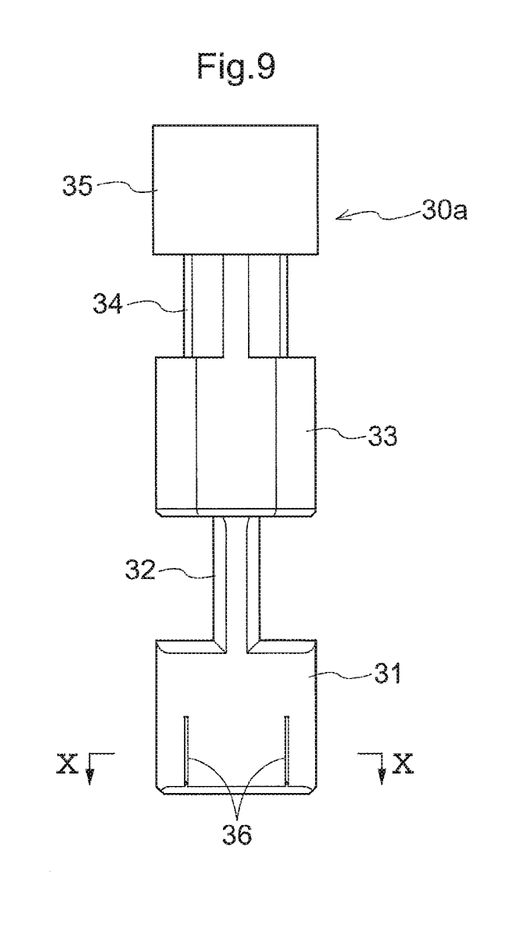
FIG. 9 is a rear view of the holder.
Figure 10:
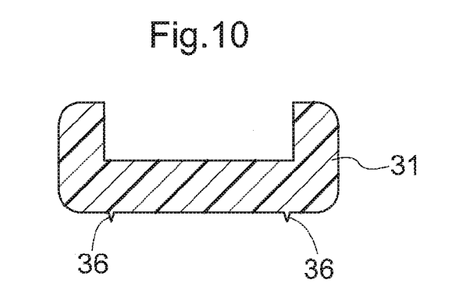
FIG. 10 is a section view taken along a line X-X in FIG. 9.

As shown in FIG. 8, the rotation detection sensor 1 is configured such that with the sensing element 10 being attached to the sensor holding portion 31 of the first holder portion 30a, the sensor holding portion 31 of the holder 30 is inserted and disposed in the case 20. The sensing element 10 is fixed in position as being pushed by the holder 30 toward the detecting face 21 (outer face of the front face portion 26) of the case 20.

A width A of the end of the sensor holding portion 31 to which the sensing element 10 is attached is larger than a width B of the portion of the end of the case 20 where the sensing element 10 is disposed. With this arrangement, in the course of insertion of the holder 30 into the case 20, contact occurs between the projecting face portion 29 formed in the rear face portion 27 and the contact portion 36 of the holder 30. The contact portion 36 is configured to be deformed by a pressing force generated when the sensing element 10 is pressed toward the detecting face 21. Accordingly, the contact portion 36 is deformed by a reaction force received from the detecting face 21 when the sensing element 10 is pressed by the holder 30. In this way, as the contact portion 36 is deformed, it is possible to reduce appropriately the pressing force applied to the sensing element 10 and to hold the sensing element 10 to the detecting face 21. As a result, the sensing element 10 can be fixed in position on the side of the detecting face 21 in a reliable manner without requiring charging of resin into the case 20 in which the element 10 is accommodated.

When the sensor holding portion 31 of the holder 30 is inserted and disposed in the sensing element accommodating portion 24 inside the case 20, the insertion opening of the case 20 is closed by the wire holding portion 33, 37 and the connecting portions 34, 38, which are cylindrical portions of the holder 30. That is, the holder 30 includes the wire holding portion 33, 39 and the connecting portions 34, 38, as a "lid portion" for closing the insertion opening of the case 20.

As the case 20, the holder 30 and the cable 40 are disposed in a mold and an amount of resin is introduced into this mold, the mold-formed portion 50 is formed. Since the holder 30 includes the lid portion (the wire holding portion 33, 37 and the connecting portions 34, 38) for closing the insertion opening of the case 20, in the course of the resin molding of the mold-formed portion 50, this lid portion (the wire holding portion 33, 37 and the connecting portions 34, 38) prevents intrusion of the rein into the case 20. With this, it is possible to restrict influence of pressure and/or heat from the molding resin to the sensing element 10. Further, with the prevention of intrusion of the resin into the case 20, it is possible also to prevent inconvenience of bulging of the sensing element accommodating portion 24 of the case 20 with the resin.

The outer faces of the case 20 and the cable 40 are formed of resin. In the course of resin molding of the mold-formed portion 50, the case 20 and the cable 40 are bonded to the mold-formed portion 50 through fusion of resin portions thereof in mutual contact with each other. With this, a step of applying bonding material to the case 20 and the cable 40 is eliminated and the sensor 1 can be manufactured easily.

In this sensor 1, the case 20 is formed like a bag and the sensing element 10 and the holder 30 are clamped between the opposed inner faces (the front face 26 and the rear face 27) of the sensing element accommodating portion 24 of the case 20. Therefore, with only inserting and disposing of the sensing element 10 and the holder 30 in the sensing element accommodating portion 24, the holder 30 will press the sensing element 10 toward the detecting face 21. Consequently, positioning and position-holding of the sensing element 10 to the detecting face 21 are facilitated.

Second Embodiment

Figure 11:
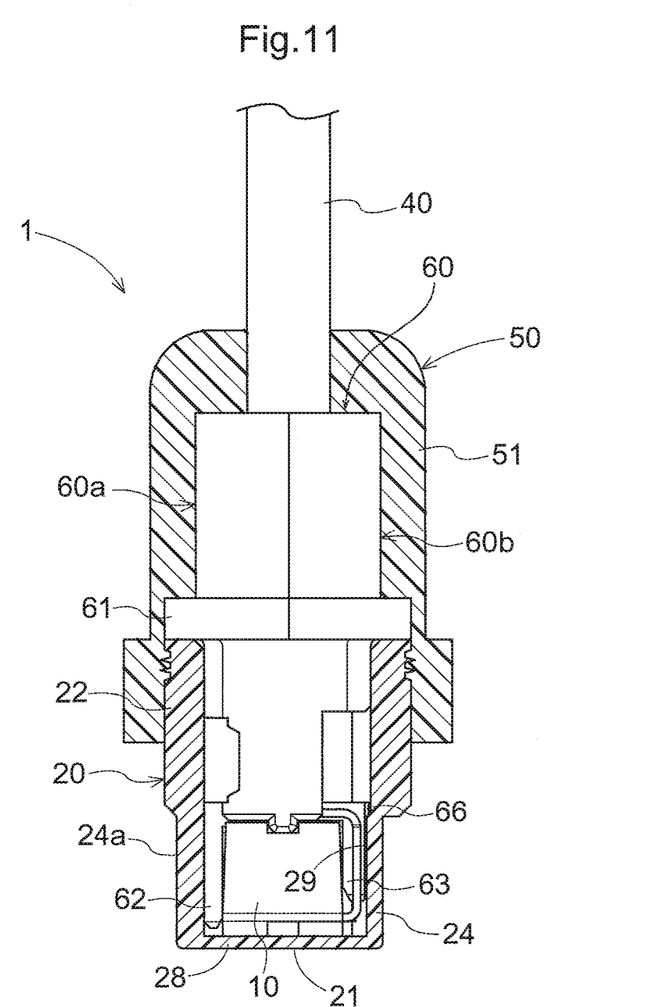
FIG. 11 is a front view in section of a sensor according to a second embodiment.
Figure 12:
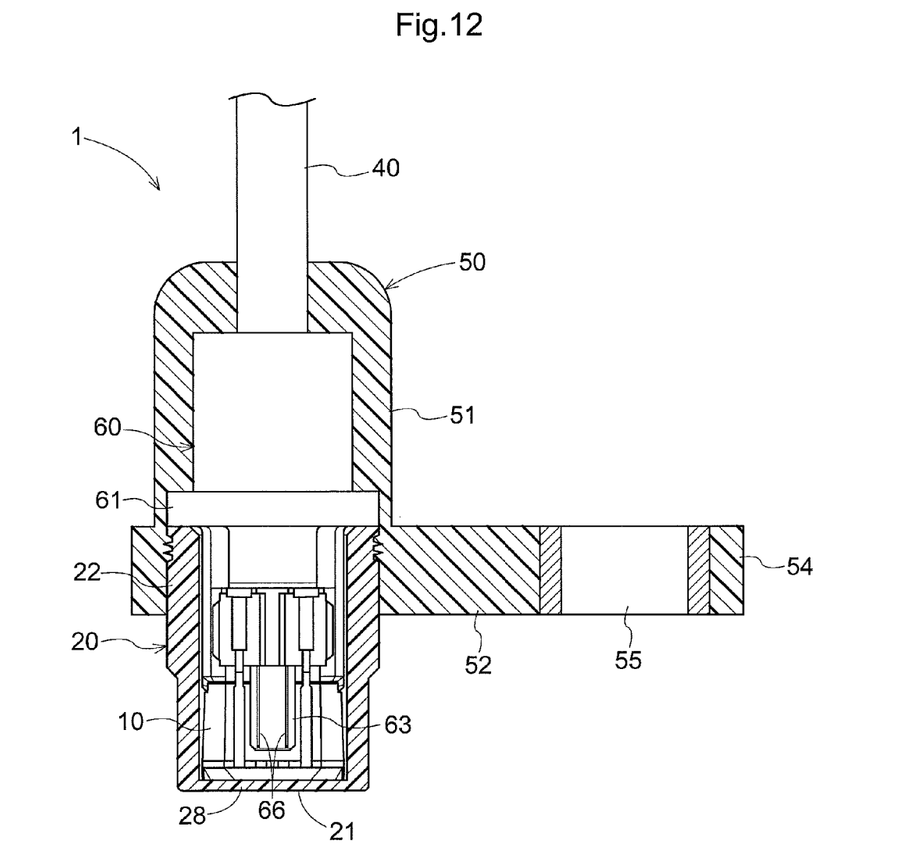
FIG. 12 is a side view in section of the sensor according to the second embodiment.

As shown in FIG. 11 and FIG. 12, in a rotation detection sensor 1 according to this embodiment, the sensing element 10 is disposed on a bottom portion 28 of the case 20. This rotation detection sensor 1 is to be disposed in opposition to e.g. a gear member (magnetic metal material or the like) which is rotated in operative association with an output side of an axle of a vehicle, an engine, a speed changer or the like. As the sensing element 10 detects a change in the magnetic field of the gear member during driving of the vehicle, it is possible to detect e.g. a speed of the axle, a rotation speed of the engine, the speed changer or the like.

The rotation detection sensor 1 includes the sensing element 10, a case 20 accommodating the sensing element 10, a holder 60 accommodated in the case 20 together with the sensing element 10, and a cable 40 electrically connected to the sensing element 10. The case 20 includes, in its outer face, a detecting face 21 for the sensing element 10. The holder 60 is disposed so as to press the sensing element 10 toward the detecting face 21.

Figure 13:
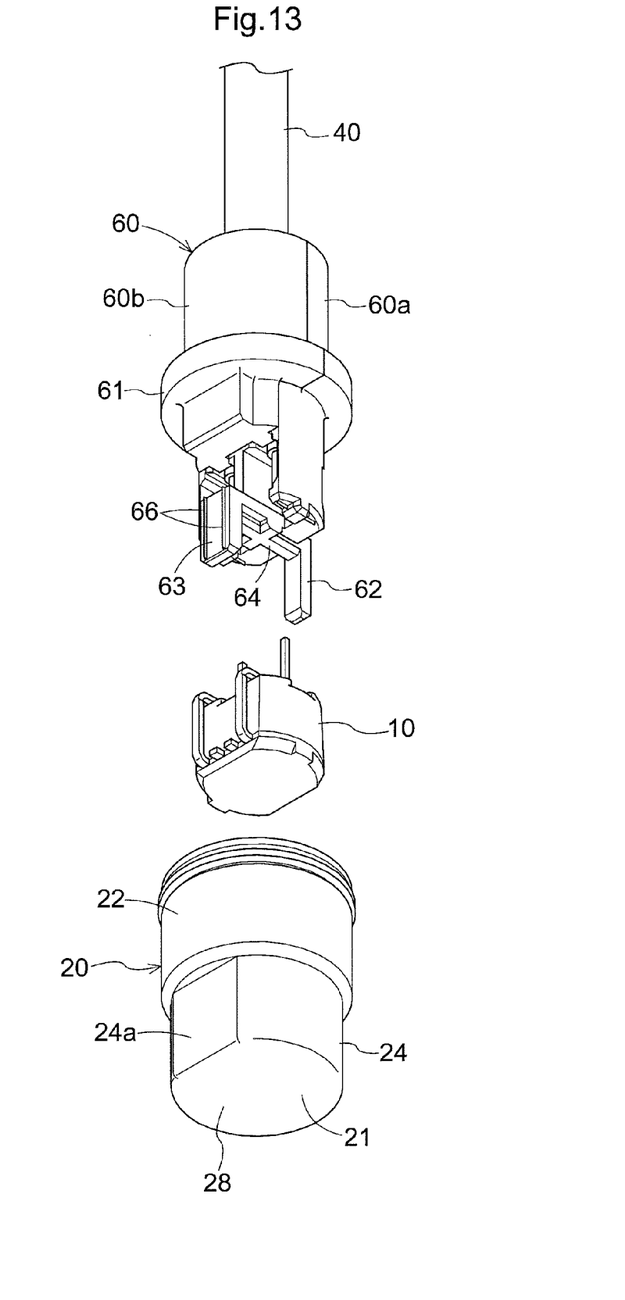
FIG. 13 is an exploded perspective view showing the sensor according to the second embodiment as seen from the rear side thereof.
Figure 14:
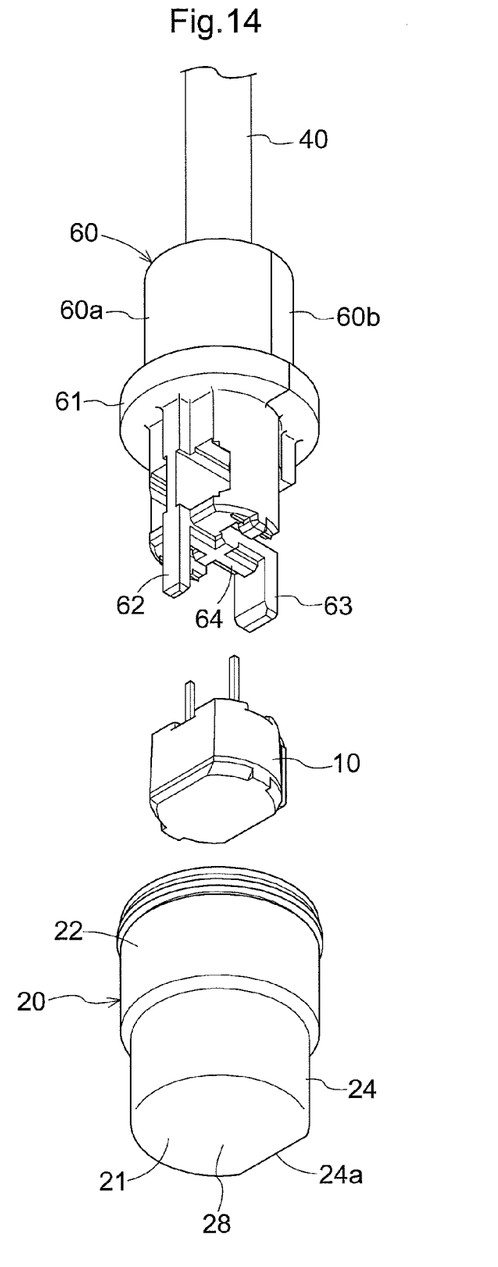
FIG. 14 is an exploded perspective view showing the sensor according to the second embodiment as seen from the front side thereof.

As shown in FIG. 13 and FIG. 14, the case 20 consists of a cylindrical portion 22 having a cylindrical outer shape and having upper and lower apertures, and a bottomed (i.e. having a bottom) sensing element accommodating portion 24 formed continuously and downwardly of the cylindrical portion 22. The sensing element accommodating portion 24 having a cylindrical outer shape forms a flat face portion 24a with a chamfered outer circumferential face. The detecting face 21 for the sensing element 10 is provided on the bottom portion 28 of the case 20. The holder 60 is formed by bonding of a split-half first holder portion 60a and a split-half second holder portion 60b to each other and includes a flange portion 61 at a longitudinally intermediate portion thereof. On the side of the holder 60 to be inserted into the case 20, there are disposed in opposition, a first leg portion 62 and a second leg portion 63 for clamping the sensing element 10 therebetween. Further, at the position of the holder 60 between the first leg portion 62 and the second leg portion 63, there is provided a contact portion 64 deformable in contact with the sensing element 10. This contact portion 64 has a cross shape and projects towards the sensing element 10.

As the sensing element 10 is clamped by the first leg portion 62 and the second leg portion 63 of the holder 60, the sensing element 10 is attached to the holder 60. Thereafter, when the leading end side of the holder 60 is inserted into the case 20, the sensing element 10 is disposed and inserted in the case 20. The sensing element 10 as caused to come into contact with the contact portion 64 by the holder 60 is pressed toward the detecting face 21 on the bottom portion 28 of the case 20, the contact portion 64 is deformed in response to a reaction force received from the detecting face 21 when the sensing element 10 is pressed by the holder 60. With this deformation of the contact portion 64, the sensing element 10 is held in contact with the detecting face 21, with the pressing force applied thereto being reduced appropriately.

The first leg portion 62 and the second leg portion 63 of the holder 60 clamping the sensing element 10 therebetween is configured to come into contact with opposed positions in the inner face of the case 20. The second leg portion 63 includes, in its outer face, a deformable projecting portion 66 which extends along the direction of inserting the holder 60 to the case 20. When the holder 60 is inserted to the case 20, this projecting portion 66 serves to guide the holder 60. Moreover, the first leg portion 62 and the second leg portion 63 restrict looseness of the sensing element 10 in the horizontal direction (the direction parallel with the detecting face 21) inside the case 20.

Other Embodiments (1) In the first embodiment described above, there was shown the example wherein the contact portion 36 is formed in the outer face of the holder 30. Alternatively, this contact portion 36 may be formed in the inner face of the case 20. However, when the contact portion 36 is to be formed in the case 20, the contact portion 36 will be formed in the inner face of the case 20. In some cases, the case 20 in which the sensing element 10 is to be disposed is formed with a narrow and elongate shape. In such cases, it is difficult to form the contact portion 36 in the inner face of the case 20. On the other hand, the contact portion 36 formed in the outer face of the holder 30 is a portion that can be formed by the mold during resin molding, so this contact portion 36 can be formed in a variety of shapes.

(2) In the second embodiment described above, there was shown the example in which the contact portion 64 of the holder 60 in opposition to the sensing element 10 has a cross shape. Alternatively, the contact portion 64 can be formed in a planar shape.

INDUSTRIAL APPLICABILITY

The sensor relating to the present invention can be used in various kinds of sensors.

The invention claimed is:
1. A sensor comprising:
a sensing element;
a case accommodating the sensing element and having a detecting face for the sensing element in one of a plurality of outer faces thereof that faces an object to be detected; and
a holder accommodated inside the case together with the sensing element and pressing the sensing element toward the detecting face;
wherein the holder includes a contact portion deformable by a pressing force generated when the sensing element is pressed toward the detecting face,
the contact portion being provided at a position where the holder and the case face each other;
the contact portion comprising a projection extending along an insertion direction of the holder and projecting in a direction perpendicular to the insertion direction; and
wherein the case and a cable to be electrically connected to the sensing element are integrated by a mold-formed portion using resin.

2. The sensor according to claim 1, wherein outer faces of the case and the cable are formed of resin; and the case and the cable are bonded to the mold-formed portion by fusion of mutually contacting resin portions thereof.

3. The sensor according to claim 1, wherein the holder includes a lid portion closing an insertion opening of the case.

4. The sensor according to claim 1, wherein the sensing element and the holder are clamped between opposed inner faces of the case.

* * * * *